United States Patent
Zhu et al.

[11] Patent Number: 6,167,357
[45] Date of Patent: Dec. 26, 2000

[54] RECURSIVE VEHICLE MASS ESTIMATION

[75] Inventors: G. George Zhu; Dennis O. Taylor; Thomas L. Bailey, all of Columbus, Ind.

[73] Assignee: Cummins Engine Company, Inc., Columbus, Ind.

[21] Appl. No.: 09/065,366

[22] Filed: Apr. 23, 1998

[51] Int. Cl.[7] .............................. G01G 19/03; G01V 9/00; G01L 5/00
[52] U.S. Cl. .............................. 702/175; 73/865; 701/102
[58] Field of Search .............................. 702/175; 73/865; 701/102

[56] References Cited

U.S. PATENT DOCUMENTS

| | | | |
|---|---|---|---|
| 4,548,079 | 10/1985 | Klatt | 73/495 X |
| 4,656,876 | 4/1987 | Fremd | 73/865 |
| 4,941,365 | 7/1990 | Reiner et al. | 73/865 |
| 5,268,842 | 12/1993 | Marston et al. | 364/431.05 |
| 5,303,163 | 4/1994 | Ebaugh et al. | 340/439 X |
| 5,434,780 | 7/1995 | Kume et al. | 477/120 X |
| 5,487,005 | 1/1996 | Genise | 477/120 X |
| 5,490,063 | 2/1996 | Genise | 477/120 X |
| 5,510,982 | 4/1996 | Ohnishi et al. | 477/120 X |
| 5,583,765 | 12/1996 | Kleehammer | 250/338.5 X |

FOREIGN PATENT DOCUMENTS 6-201523 7/1994 Japan.

OTHER PUBLICATIONS

Lennart Ljung, System Identification—Theory for the User, Recursive Estimation Methods, Month not given 1987 Prentice–Hall, pp. 303–113

Primary Examiner—Thomas P. Noland
Attorney, Agent, or Firm—Woodard, Emhardt, Naughton, Moriarty & McNett

[57] ABSTRACT

A method and apparatus is disclosed for recursively estimating vehicle mass and/or aerodynamic coefficient of a moving vehicle. The vehicle speed and push force data are collected and a segment of qualified data is then selected from the collected data. Newton's second law is integrated to express vehicle mass and/or aerodynamic coefficient in terms of vehicle push force and vehicle speed. This expression is then used in a recursive analysis of the qualified data segment to determine an estimated vehicle mass and/or aerodynamic coefficient.

13 Claims, 4 Drawing Sheets

RECURSIVE VEHICLE MASS ESTIMATION

FIELD OF THE INVENTION

This invention relates in general to control systems for vehicles and more specifically to vehicle mass estimation techniques.

BACKGROUND OF THE INVENTION

The determination of vehicle mass is important to the efficient operation of today's vehicles, especially in the heavy-duty commercial and industrial truck industries. For example, mass can be a selection criteria for proper gear changing control in a transmission having staged gears. Vehicle mass may also be used by various vehicle controllers in anti-lock brake systems, intelligent vehicle/highway systems and fleet management systems, to name a few. In addition, vehicle mass can be useful in speed control systems, such as for use with a cruise control system. One problem with using vehicle mass as a control parameter is that it varies with vehicle loading and is usually difficult to predict with certainty, especially with respect to heavy-duty trucks. For example, a dump truck can have a mass when loaded up to ten tons greater than when empty. In the case of a semi-tractor with a trailer, the mass when loaded can be up to 40 tons greater than when empty.

Because the mass of a particular vehicle may vary greatly, a means for accurately measuring actual vehicle mass when the vehicle is in operation is required if the dynamic vehicle mass is to be used as a control parameter. Thus, if the mass parameter is fixed at a particular value in the control system, then the various control features described above will not allow for optimal vehicle performance under all types of load conditions.

Various methods of measuring vehicle mass have been the subject of prior patents. In U.S. Pat. No. 5,490,063 to Genise, a method for determining vehicle mass as a function of engine output or driveline torque, vehicle acceleration, and the currently engaged gear ratio is disclosed. For this method, Newton's law is used directly with acceleration and force values determined from the torque and gear ratio input to estimate vehicle mass. Likewise, in U.S. Pat. No. 4,548,079 to Klatt, a method is disclosed for determining vehicle mass directly using engine output torque values and acceleration values.

Vehicle acceleration is typically computed from either engine or vehicle speed data. However, one of the problems associated with the collection of speed data is that speed signal is typically very noisy. When vehicle acceleration is used to determine the vehicle mass, the noise problem is even more significant. In order to determine acceleration, it is often necessary to measure the increase or decrease in speed values at very close time intervals. This differentiation in speed values at close time intervals causes the acceleration signal to be buried in the noise of the speed signal. Inaccurate determinations of vehicle acceleration and a correspondingly inaccurate determination of vehicle mass may result. The various controllers relying on an accurate vehicle mass determination may in turn perform ineffectively and inefficiently.

What is therefore needed is a technique for estimating vehicle mass that addresses the foregoing shortcomings. Such a technique should provide reliable, accurate estimates of vehicle mass. The method should also effectively address the problems created by the inherent noise contained in speed signal data. The technique should also be inexpensive to implement, and be readily integratable into existing vehicle control systems.

SUMMARY OF THE INVENTION

The present invention addresses the foregoing shortcomings in estimating vehicle mass. In accordance with the present invention, a technique for processing vehicle speed signal data and vehicle push force data to estimate vehicle mass is disclosed. The technique results in an accurate and reliable estimate of vehicle mass and/or aerodynamic coefficient. The technique also minimizes the effects of speed signal noise in the computation of vehicle mass.

In accordance with one aspect of the present invention, a method is disclosed for estimating the mass of a vehicle that has an internal combustion engine producing a torque in accordance with a fueling rate provided by a fueling system thereof. The torque is applied to a drive-train coupled to the engine. The drive train includes a transmission coupled to the engine that has a plurality of engageable gear ratios, a drive axle, and a propeller shaft coupling the drive axle to the transmission. The drive axle has at least one wheel for moving the vehicle. This method includes: (a) continually determining a vehicle speed and a vehicle push force corresponding to the vehicle speed and storing corresponding vehicle speed and vehicle push force data within a memory portion of a control computer; (b) qualifying a segment of the vehicle speed and push force data; and (c) determining vehicle mass by a recursive least square estimation analysis of the qualified segment of data by defining the vehicle speed as a function of the push force. A vehicle aerodynamic coefficient may also be determined.

In another aspect of the invention, the determination of vehicle speed and push force includes determining a shift status. Additionally, the qualification of the data segment may include buffering the vehicle speed, push force, and shift status data, and selecting the longest qualified segment therefrom. The invention may further include correcting the estimated vehicle mass and aerodynamic coefficient when one of the estimates falls outside an upper or lower limit.

In a further aspect, a control system for a vehicle is disclosed for estimating mass of the vehicle. The control system includes an engine with a fueling system associated therewith, a transmission coupled to the engine having a plurality of engageable gear ratios, a drive axle, and a propeller shaft coupling the transmission to the drive axle. The system further has means for determining a vehicle speed and providing a vehicle speed signal corresponding thereto; means for determining an engine fueling rate and providing an engine fueling rate signal corresponding thereto; means for determining a presently engaged gear ratio of the transmission and providing a gear ratio signal corresponding thereto; and a processor responsive to the engine fueling rate signal and the gear ratio signal to determine a vehicle push force corresponding to the vehicle speed signal. The processor is further responsive to qualify a data segment from these signals and calculate an estimated vehicle mass by a recursive analysis of the qualified data segment, where the vehicle speed is expressed as a function of push force.

In another aspect of the present invention, the control system further includes a data communications link connected to the processor, with the engine percentage torque, the vehicle speed signal, the gear ratio signal, or the gear engagement signal being provided to the processor from a remote processor via the data communications link.

It is one object of the present invention to provide a technique for filtering and qualifying speed signal data and push force data so it may be used to accurately estimate vehicle mass.

It is another object of the present invention to provide a technique for recursively analyzing speed and push force data to estimate vehicle mass and/or aerodynamic coefficient which minimizes effects of external factors and the error associated with estimates based on little data.

Another object of the present invention is to provide a mass and/or vehicle aerodynamic coefficient estimation technique that is readily integratable into existing control systems.

It is yet another object of the present invention to optimize the performance and efficiency of vehicle systems and components by providing accurate estimates of vehicle mass and/or aerodynamic coefficient.

These and other objects of the present invention will become more apparent from the following description of the preferred embodiment.

DESCRIPTION OF THE PREFERRED EMBODIMENT

Figure 1:
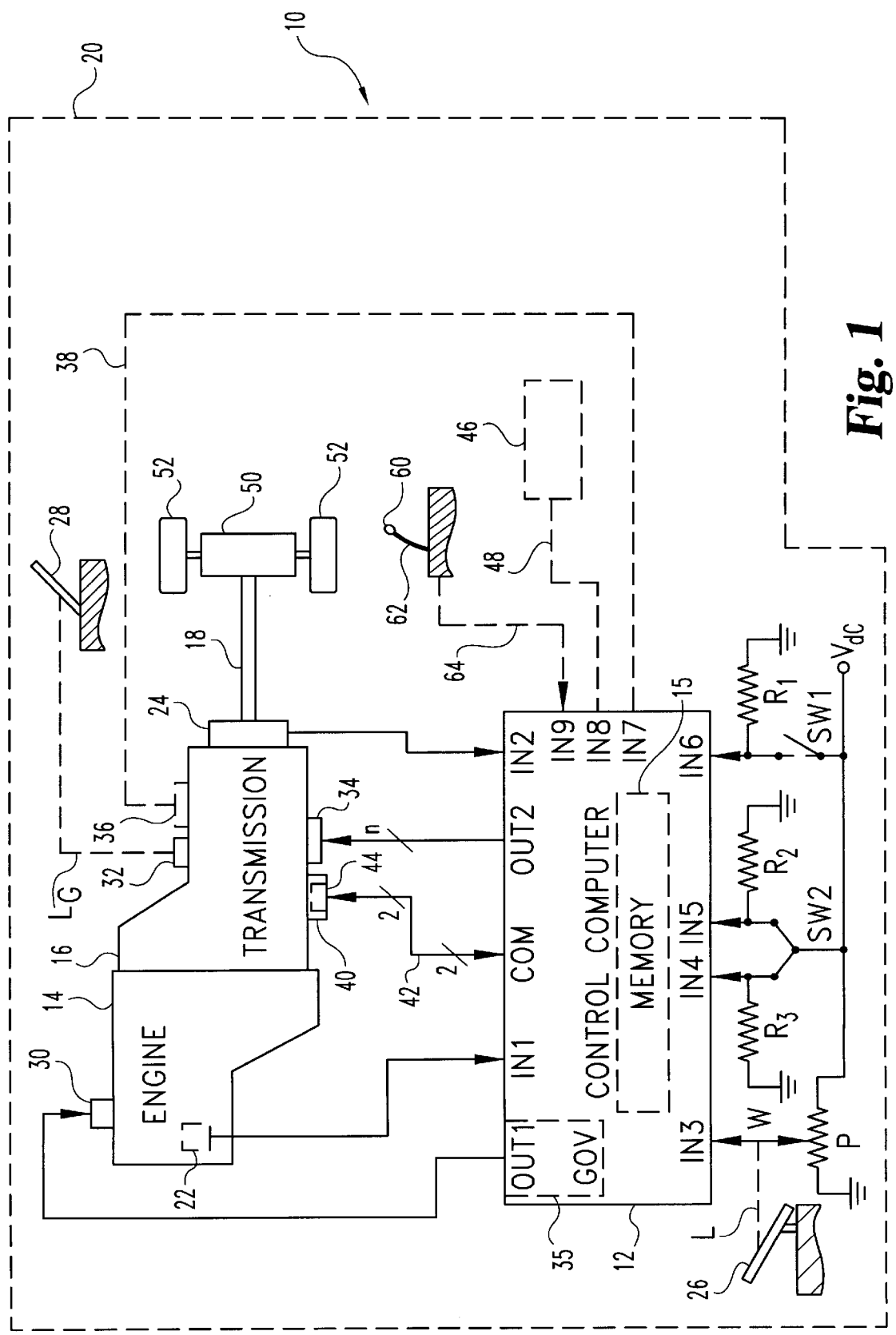
FIG. 1 is a block diagram illustration of one preferred embodiment of a vehicle control system in accordance with the present invention.

For the purposes of promoting an understanding of the principles of the present invention, reference will now be made to the embodiment illustrated in the drawings and specific language will be used to describe the same. It will nevertheless be understood that no limitation of the scope of the present invention is thereby intended, any alterations and further modifications in the illustrated systems, and any further applications of the principles of the present invention as illustrated therein being contemplated as would normally occur to one skilled in the art to which the present invention relates.

Referring now to FIG. 1, an engine control system for measuring vehicle mass and providing a signal corresponding thereto to regulate various operational parameters in accordance therewith, all in accordance with the present invention, is shown and designated generally at 10. Central to control system 10 is a control computer 12 which interfaces with various components of a motor vehicle. Control computer 12 is preferably microprocessor-based and includes a memory portion 15, a digital I/O, a number of analog-to-digital (A/D) inputs, and at least one communications port (COM) such as the Universal Asynchronous Receiver/Transmitter (UART) variety and SAE J1939 datalink.

The microprocessor portion of control computer 12 runs software routines and manages the overall operation of control system 10. The present invention contemplates using any one of a number of known microprocessors capable of managing and controlling control system 10.

The memory portion 15 of control computer 12 may be of one or more types, including, but not limited to ROM, RAM, EPROM, EEPROM, flash, electromagnetic, optical, or any other variety of memory known to those of ordinary skill in the art. Memory portion 15 may be further supplemented via external memory connected thereto (not shown).

An internal combustion engine 14 is operatively connected to a main transmission 16 as is known in the art. A propeller shaft, or tail shaft 18 extends from transmission 16. Transmission 16 is operable to rotatably actuate propeller shaft 18 to provide driving power to one or more vehicle wheels 52 connected to a drive axle 50. Transmission 16 may also be operable to actuate power take-off (PTO) devices and other known drivetrain components.

A number of sensors and actuators permit control computer 12 to interface with some of the various components of control system 10 as well as other vehicle and engine systems. For example, engine 14 includes an engine speed sensor 22 mounted thereto or therein which is electrically connected to control computer 12 via input IN1. Engine speed sensor 22 is preferably a known Hall effect device operable to sense speed and/or position of a toothed gear rotating synchronously with the engine crank shaft (not shown). However, the present invention contemplates using any known engine speed sensor 22, such as a variable reluctance sensor, which is operable to sense engine rotational speed and provide a signal to control computer 12 corresponding thereto.

A vehicle speed sensor 24 is preferably operably connected to propeller shaft 18 and electrically connected to control computer 12 via input IN2. Alternatively, vehicle speed sensor 24 is electrically connected to a transmission controller, and control computer 12 obtains vehicle speed through communication port COM. In still another embodiment, vehicle speed is determined via global positioning system (GPS) technology. However, vehicle speed sensor 24 is preferably a variable reluctance sensor operable to sense rotational speed of propeller shaft 18 and provide a vehicle speed signal to control computer 12 corresponding thereto. While vehicle speed sensor 24 is shown in FIG. 1 as being located adjacent to transmission 16, it is to be understood that sensor 24 may be located anywhere along propeller shaft 18. The present invention further contemplates using any other known vehicle speed sensor operable to provide a vehicle speed signal indicative of forward (and/or reverse) vehicle velocity. For example, vehicle speed sensor could be mounted on a hub of a wheel of the vehicle.

In one preferred embodiment, both engine speed sensor 22 and vehicle speed sensor 24 include a marker placed on a rotating object, such as a crankshaft or wheel. As the object rotates, the marker passes by a pick-up situated at a predetermined location along the periphery of the object to generate a corresponding train of pulses. The rate of these pulses is proportional to the engine or wheel speed, whichever is being measured. Moreover, by providing different angular spacing of the markers, crank angle may be determined from a corresponding difference in the pulse train spacing. In one example, the markers are provided by the teeth formed along the periphery of the wheel from a material that causes a magnetic field perturbation as it moves by the pick-up. The pick-up is a hall-effect device which generates the pulse train corresponding to the engine speed. U.S. Pat. No. 5,268,842 to Marston et al. is cited as an additional source of information concerning such arrangements. In other embodiments, a different technique for detecting speed may be employed as would occur to one skilled in the art.

Control system 10 further includes a fuel system 30 electronically controlled by control computer 12, and is preferably responsive to torque request signals provided by either operator actuation of an accelerator pedal 26, or generated by control computer 12 pursuant to some type of computer controlled fueling condition as is known in the art. Examples of some well known computer controlled fueling conditions include, but are not limited to, cruise control operation, auto-starting of the vehicle, computer commanded fueling when shifting a shift-by-wire type of transmission 16, and the like. Additionally, a torque request signal could be provided by an auxiliary computer, and passed to control computer 12 via datalink 42, which will be discussed in greater detail hereinafter. In any event, the torque request signal may be indicative of a signal provided to control computer 12 via driver actuation of accelerator pedal 26, or a computer-generated signal generated by control computer 12 or an auxiliary computer pursuant to some type of computer controlled fueling condition as described above.

Accelerator pedal 26 is preferably mechanically connected via linkage L, to the wiper W of a potentiometer P. The wiper W is connected to an A/D input IN3 of control computer 12, and the position or percentage of accelerator pedal 26 corresponds directly to the voltage present on wiper W. One end of potentiometer P is connected to a voltage $V_{DC}$, and the other end is connected to ground potential. The voltage present on wiper W thus ranges from $V_{DC}$ to ground potential. Control computer 12 converts the analog voltage on wiper W to a digital quantity representative of driver requested torque. The present invention further contemplates other known sensors associated with accelerator pedal 26 to provide one or more analog and/or digital signals corresponding to accelerator pedal position or pressure applied to accelerator pedal 26. In any event, control computer 12 processes the analog and/or digital accelerator signal(s) provided by accelerator pedal 26 to provide a torque request signal as described above.

A known cruise control system preferably includes switches SW1 and SW2 mounted in the driver's cab or compartment. Switches SW1 and SW2 provide the driver with a means for turning the cruise control functions on and off via switch SW1 and for establishing a cruise speed via switch SW2. Switch SW2 also provides input signals to control computer 12 to actuate resume/acceleration features well known in the art of cruise control systems. Switch SW1 thus enables cruise control mode of operation while switch SW2 is used to activate the operational modes of the cruise control system built into the software of control computer 12. Switch SWI is connected at one end to $V_{DC}$, and at its opposite end to input iN6 of control computer 12 and resistor R1, which is referenced at ground potential. Input IN6 is thus normally at ground potential while switch SW1 is open (cruise control is off), while input aN6 switches logic to high voltage ($V_{DC}$) when switch SW1 is closed (cruise control on). Switch SW2 is a momentary center-off Single Pole Double Throw (SPDT) switch. The center position is connected to $V_{DC}$, a first switch position is connected to control computer input IN4 and resistor $R_3$, which is referenced at ground potential. The remaining position of switch SW2 is connected to control computer input IN5 and resistor $R_2$, which is also referenced at ground potential. The set/coast cruise control function is activated by shorting input IN4 of control computer 12 to logic high voltage, $V_{DC}$. The resume/acceleration feature of the cruise control system is activated by shorting input IN5 of control computer 12 to logic high voltage $V_{DC}$. These operational features are activated by driver actuation of switch SW2 as is known in the art. While the foregoing description is directed to one preferred cruise control embodiment, it is to be understood that any cruise control system known to those skilled in the art is contemplated. In any case, control computer 12 is responsive to the cruise control signals at inputs IN4, IN5, and IN6 to determine therefrom a torque request signal as described above.

Regardless of the mechanism controlling the torque request signal to control computer 12, a governor portion 35 of control computer 12 is operable to process the torque request signal and provide an engine fueling signal or fuel rate signal therefrom, which signal is provided at output OUT1. Output OUT1 is the output of governor 35 and is connected to the fueling system 30 of the engine 14. Fueling system 30 may be any conventional fueling system known to those skilled in the art.

One preferred technique for converting the torque request signal to a fueling signal involves mapping the requested torque to an appropriate engine fueling rate stored in memory unit 15. While many factors other than requested torque affect the choice of engine fueling rate, the appropriate fueling rate information is converted to a corresponding timing signal provided to engine fuel system 30 via output OUT1. The present invention contemplates, however, that other known techniques may be used to convert the torque request signal to a timing signal suitable for use by engine fueling system 30. In accordance with the present invention, a control algorithm is provided to further adjust the appropriate timing signals to fuel system 30 based on an estimated mass of the vehicle.

Transmission 16 may be any known manual, automatic, or manual/automatic transmission having a plurality of selectable gear ratios. For any manually selectable gear ratios, transmission 16 includes a mechanical input 32 coupled via linkage $L_G$ to a gear shift lever 28 typically located in the cab area of the vehicle. As is known in the art, gear shift lever 28 is manually actuated to select any one of a plurality of manual gear ratios of transmission 16. For any automatically selectable gear ratios, transmission 16 includes one or more actuators 34 which is/are electrically connected to output OUT2 of control computer 12. As shown in FIG. 1, output OUT2 of control computer 12 is connected to one or more automatic gear actuators 34 via n signal lines, where n is an integer value indicating the number of signal lines. Typically, the one or more automatic gear actuators 34 are electrically actuated solenoids responsive to control signals provided thereto to control selection of a corresponding automatic gear ratio of transmission 16.

Control system 10 may include various mechanisms for providing control computer 12 with information relating to the presently engaged gear ratio of transmission 16. Preferably, memory unit 15 of control computer 12 includes certain information relating to transmission 16, so that control computer 12 is operable to determine the presently engaged gear ratio of transmission 16 at any time the vehicle is moving at a speed sufficient to provide a valid speed signal. The presently engaged gear ratio is preferably computed as a ratio of engine speed (provided at input IN1) to vehicle speed (at input IN2). However, the present invention contemplates several alternative techniques for determining presently engaged gear ratio of transmission 16. For example, transmission 16 may include electrical componentry 36 operable to provide a signal to input IN7 of control computer 12 via signal path 38, which signal is indicative of presently engaged gear ratio. In one embodiment, componentry 36 may include or interface with a number of micro-switches associated with the various transmission gears. The collective states of the various switches may be used to provide a signal indicative of presently engaged gear ratio. Alternatively, componentry 36 may include transmission input speed and output speed sensors and a processor operable to evaluate the transmission input and output speeds to provide a presently engaged gear ratio signal corresponding thereto. The present invention further contemplates that any known electrical componentry 36 may be used to provide a control computer 12 with information relating to the presently engaged gear ratio of transmission 16.

As another alternative technique for determining the presently engaged gear ratio of transmission 16, transmission 16 may be equipped with circuitry 40 operable to determine the operational state or status of transmission 16, which circuitry may include a microprocessor 44. A communication bus 42 is connected at one end to a communication port of microprocessor 44, and at an opposite end to a communications port COM of control computer 12. Preferably communications bus or datalink 42 is an SAE (Society of Automotive Engineers) J1939 standard. According to the J1939 bus industry standard, control computer 12 and microprocessor 44 are operable to send and receive information relating to engine, transmission, and/or vehicle operation. Thus, all information available on communication bus 42 is available not only to control computer 12 but to microprocessor 44 as well.

Microprocessor 44 may use any information available on communication bus 42, or may use any of the electrical components within electrical circuitry 40 to determine the status of transmission 16, such as presently engaged gear ratio, out-of-gear condition, etc., in accordance with any of the previously discussed techniques. In one embodiment, microprocessor 44 may then transmit such gear ratio information over communication bus 42 to control computer 12 for further processing. Additionally, microprocessor 44 may process and/or compute the torque request signal from appropriate data and/or signals, provided thereto via datalink 42 and/or other inputs to microprocessor 44, and provide the torque request signal to control computer 12 via the datalink 42. It should be further understood that any auxiliary computer connected to datalink 42 would have access to any and all information necessary to compute the torque request signal, and could therefore compute the signal and provide it to control computer 12.

Control system 10 may additionally include a brake pedal 60 attached to the vehicle as known in the art. A brake pedal sensor 62 is operable to detect engagement of brake 60 by a driver and provide a control signal indicative thereof. Brake pedal sensor 62 is electrically connected at input IN9 to control computer 12 via signal path 64.

In one alternate embodiment of the control system 10 of the present invention, control system 10 includes an acceleration sensor/system 46 attached to the vehicle 20 and electrically connected input IN8 of control computer 12 via signal path 48. Acceleration sensor/system 46 is designed with sufficient sensitivity to provide control computer 12 with one or more signals indicative of vehicle acceleration resulting from driver actuation of accelerator pedal 26. Acceleration sensor/system 46 may be any known accelerometer or acceleration sensing system capable of providing control computer 12 with appropriate vehicle acceleration information.

Figure 2:
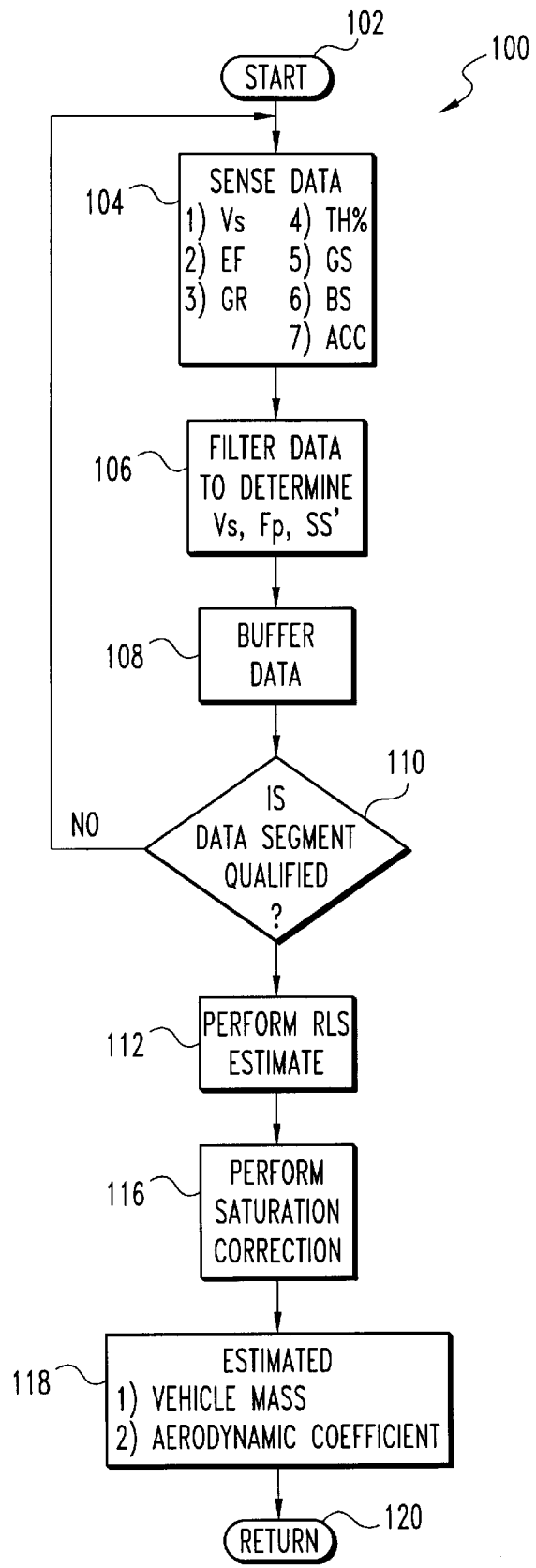
FIG. 2 is a flowchart of one preferred embodiment of a mass estimation algorithm executable by a controller of the control system of FIG. 1.

Referring now to FIG. 2, one preferred embodiment of software algorithm 100 for determining vehicle mass and/or aerodynamic coefficient, in accordance with the present invention, is presented in flowchart form. The algorithm of FIG. 2 is preferably executable by control computer 12. In one preferred embodiment, algorithm 100 is performed at a cycle time of every 4 seconds. However, it should be understood that algorithm 100 may be performed at any desired time cycle, so long as the principles of the present invention are accomplished.

In order to promote an understanding of the principles of the present invention, the stages of routine 100 pertaining to the gathering, filtering and qualifying of data will now be described generally. Further description of each stage is provided after the general description.

Control computer 12 continually senses data from various sensors and devices of control system 10 as described hereinabove. This data is then filtered and/or converted in order to determine and group data points in accordance with time. These grouped data points represent the vehicle speed, the vehicle push force, and the shift status. The grouped data points are placed into a buffer until a predefined capacity of the buffer is reached. Each group of data points is then either qualified or not qualified as described more fully below. The longest continuous segment of qualified data points (if any) is then selected from the buffer in order make one estimate of vehicle mass in accordance with the present invention.

A predetermined number of subsequent groups of data points are placed in the buffer in order to replace a corresponding number of the previously qualified data points. In one preferred embodiment, half of the previously qualified data points are replaced. The mass of the vehicle is again recursively estimated in accordance with the present invention. These steps are repeated throughout operation of the routine 100.

It should be noted that the preferred determination of vehicle push force and vehicle speed of the present invention does not take into account certain non-ideal aspects of vehicle operation, such as tire slippage and gear inefficiencies. While such factors generally have a minor impact, alternative embodiments may account for these factors to provide a more accurate result. For example, actual vehicle speed may be determined by subtracting a tire slippage parameter, and actual vehicle push force may be determined by subtracting parameters corresponding to tire slippage and gear losses.

The routine 100 will now be described in detail. Routine 100 starts at stage 102 and continues at stage 104, where control computer 12 receives data sensed by the various actuators and sensors described above. It should be understood that the data of stage 104 is sensed several times per second. In one preferred embodiment, the data of stage 104 is sensed 100 times per second. Other embodiments anticipate data readings at other frequencies as known to those of skill in the art.

The data gathered at stage 104 will now be described in detail. The vehicle speed, indicated as Vs, is an indication of the speed of the vehicle preferably provided by vehicle speed sensor 24. The engine fueling rate is indicated by EF. Typically, the signal corresponding to EF is delayed due to the time required for fuel system responses and combustion of the fuel. Fuel system delay is a function of the type of engine, the type of fuel system, and other operating parameters associated therewith.

The control computer 12 also receives signals corresponding to the engaged gear ratio of the transmission which is designated as GR. Each gear ratio of a transmission has a gear path associated therewith, as known in the art. The control computer also senses the amount of throttle that is currently engaged, designated as TH%, by the operator of the vehicle. The throttle percentage is determined by accelerator pedal position as described hereinabove. Alternatively, the throttle percentage may be replaced by the determination of torque percentage (engine load). Torque percentage is defined as the current engine fueling divided by the maximum engine fueling.

The control computer 12 also senses the gear status of the transmission, designated as GS. The gear status is a determination of whether the transmission is engaged in a current gear or is in between gear changes. Finally, the average vehicle acceleration, designated as ACC, may be determined by any known technique. In the preferred embodiment, average vehicle acceleration is determined by calculating the difference between the maximum and minimum vehicle speeds stored in the buffer. Other alternate embodiments contemplate other techniques for determining average vehicle acceleration, including differentiating the vehicle speed over time, relating the change in engine speed to vehicle acceleration, or determining vehicle acceleration by an acceleration sensor as discussed hereinabove.

From stage 104, routine 100 continues at stage 106 where the data gathered in stage 104 is filtered by control computer 12 to determine and/or compute vehicle speed ($V_S'$) push force (Fp), and shift status (SS). $V_S'$ is the vehicle speed gathered at stage 104 that has been filtered in order to reduce or eliminate noise in the vehicle speed signal provided by sensor 24. It is well known in the art that many factors may cause noise in the vehicle speed signal, including, but not limited to, road conditions, wind, and other forces external and internal to the vehicle, as well as noise inherent in analog sensor based systems. Thus, it is sometimes necessary to employ various techniques to reduce or eliminate these effects. In one embodiment, the noise is reduced by averaging vehicle speed signal readings to produce a single reading. In one preferred embodiment of the present invention, the filtered vehicle speed is determined as an average of ten speed readings. Other embodiments contemplate averaging any different number of speed readings or such other filtering techniques as would occur to those skilled in the art. In addition to filtering, any conversions necessary to convert vehicle speed from, for example, miles per hour to meters per second are performed in converting $V_S$ to $V_S'$.

Engine fueling is used to calculate the push force (Fp) of the vehicle. As discussed previously, the engine fueling signal is delayed so that it corresponds to the vehicle speed readings. In the preferred embodiment, engine fueling is internally calculated by control computer 12. Alternate embodiments contemplate an engine fueling signal that is noisy, similar to the vehicle speed readings as discussed above. Thus, any known filtering technique, including averaging any number of engine fueling signals may likewise be performed.

After obtaining an engine fueling signal, the fueling signal is converted to engine output torque using known equations programmed into control computer 12 relating engine fueling to engine output torque. In general, engine torque is a function of fueling, engine speed, timing, air temperature, intake manifold pressure, etc. For simplification, it is preferred to estimate engine torque as a function of engine fueling only, using constants to approximate the other variables. In one embodiment, engine fueling and engine output torque are linearly related. Other embodiments contemplate different relationships, which depend in part on the type of engine and fuel system involved. The conversion may also be performed by using one or more schedules, tables, or graphs relating engine output torque to engine fueling. Engine output torque is then converted to tire torque by multiplying engine output torque by the currently engaged gear ratio and axle gear ratio. The tire torque is then multiplied by the radius of one of the tires to obtain vehicle push force, (Fp). Thus, stage 106 results in a grouping of data which has been filtered and/or calculated, the grouped data including at least a vehicle speed, Vs. and a vehicle push force, Fp, each corresponding to a single point in time. The grouped data is stored in control computer 12.

Also determined at stage 106 is the shift status, designated as SS, which may be additionally grouped with vehicle speed and push force. The shift status is a qualification condition or value determined by observing three requirements: the throttle percentage (TH%), brake status (BS), and gear status (GS) sensed at stage 104. In one preferred embodiment, the throttle percentage is required to be at least 30% in order to ensure an accurate vehicle push force calculation. Other embodiments contemplate use of any other throttle percentage, so long as risk of external forces applied to the vehicle is minimized. Additionally, the use of throttle percentage may be replaced with a determination of percentage torque as discussed hereinabove. A second requirement, or qualification condition, is that the brake not be engaged. A brake torque applied to the wheels of the vehicle would cause an error in the push force calculation. A third requirement, or qualification condition, for shift status is that the transmission not be performing a gear change, or be out of gear. This is due to inaccuracies that may result in the push force calculation when one of the computers (12, 44) takes over control of engine fueling during a gear change, for example. Thus, if the throttle percentage threshold requirement is not met, the brake is engaged, or the transmission is engaged in a gear change, shift status is assigned a value of 1. For all other conditions, shift status is assigned a value of 0.

Once the data has been filtered in accordance with stage 106, routine 100 proceeds at stage 108, where the filtered data is buffered into three buffer blocks by control computer 12. One buffer block is assigned to each of filtered vehicle speed ($V_S'$), push force (Fp), and shift status (SS). The size of the buffer may be established to include virtually any number of data points. In one embodiment, each buffer block is sized to include two times the number of data points collected between runs of algorithm 100. For example, if routine 100 is designed to run every four seconds, and data is filtered every 10 hertz, then there will be 40 new data points corresponding to each of vehicle speed, push force, and shift status each time routine 100 is performed. However, each buffer will include 80 data points, so 40 data points from the previous run of routine 100 will be included in the subsequent run of routine 100. Thus, routine 100 is run every 4 seconds using 80 data points. This approach ensures that all data is analyzed more than a single time by crossing the sample periods.

The routine 100 proceeds from stage 108 at stage 110, where the buffered data of stage 108 are qualified to certain threshold requirements. The data meeting the threshold requirements are determined to be qualified data. In order to meet the threshold requirements, the data must meet the following conditions: 1) shift status must be equal to 0; and 2) the average vehicle acceleration must be greater than a predetermined threshold. In addition, other conditions may be imposed in order to minimize road condition effects, etc., by requiring that vehicle speed be within certain ranges. The shift status requirement assures that transmission 16 is in-gear and a minimum throttle condition is being met as discussed above. The acceleration threshold is necessary to ensure the vehicle is not in a deceleration mode. It should be understood that these threshold qualification requirements for the qualified data may be varied, in a manner known to those skilled in the art, so long as the data is capable of being reliably used to estimate vehicle mass in accordance with the principles of the present invention.

Other conditions may additionally be imposed on the filtered and buffered data before it may be further processed. For example, if a pair of data points is determined to be qualified, it is grouped with surrounding qualified data points, if any, in order to define a segment of a number of consecutive qualified data points. A segment of consecutive qualified data points requires that all data pairs of push force and vehicle speed in that segment meet the threshold requirements of acceleration and shift status (or any other threshold requirements deemed necessary). Thus, a block of buffered data may include many, one, or no qualified data segments. If there are no qualified data segments, algorithm execution is terminated and returned to step 102 for the sensing, filtering, and buffering of an additional cycle of data points as described above. If there is more than one qualified data segment, then the longest data segment is selected. In one embodiment, the qualified data segment must include at least 25 pairs of consecutive data points meeting the threshold qualification requirements, as discussed above. However, other embodiments contemplate qualified data segments including any number of data points.

If a qualified data segment is found and selected by control computer 12 at step 110, the algorithm 100 then proceeds at step 112. Step 112 involves a recursive least square (RLS) estimate of vehicle mass and aerodynamic coefficient using data points from the qualified data segment. In order to relate the push force of the vehicle to vehicle speed, control computer 12 uses an integrated Newton's second law. Newton's second law may be written as follows:

$$F = m \cdot \dot{V} + c \cdot V$$

Where F is vehicle push force, m is vehicle mass, $\dot{V}$ is vehicle acceleration, V is vehicle speed, and c is the vehicle aerodynamic coefficient. For purposes of the present invention, the effect of road grade is ignored.

In order to relate vehicle force in terms of vehicle speed, it is necessary to integrate the above equation in order to eliminate $\dot{V}$. This results in the following equation:

$$\int_{T1}^{T2} F \cdot dt = m \cdot [V(T_2) - V(T_1)] + c \cdot \int_{T1}^{T2} V dt$$

where F and V are the vehicle push force and speed at time T.

Now suppose that nxm data points are sampled at 1/T HZ, and let $F_{INT}$ (i) and $V_{INT}$ (i) represent the integrated push force and vehicle speed between $(k-1) \cdot m \cdot T$ and $k \cdot m \cdot T$ $$F_{INT}(k) = \int_{(k-1) \cdot m \cdot T}^{k \cdot m \cdot T} F dt = \sum_{j=(k-1) \cdot m}^{k \cdot m - 1} F(j - T) \cdot T$$

$$V_{INT}(k) = \int_{(k-1) \cdot m \cdot T}^{k \cdot m \cdot T} V dt = \sum_{j=(k-1) \cdot m}^{k \cdot m - 1} V(j - T) \cdot T$$

Let V(k) represent the vehicle speed at $k \cdot m \cdot T$, then the following equation states the relationship between push-force speed, mass, and aerodynamic coefficient of the vehicle:

$$\begin{bmatrix} F_{INT}(1) \\ F_{INT}(2) \\ \vdots \\ F_{INT}(n) \end{bmatrix} = \begin{bmatrix} V(1) - V(0) & V_{INT}(1) \\ V(2) - V(1) & V_{INT}(2) \\ \vdots & \vdots \\ V(n) - V(n-1) & V_{INT}(n) \end{bmatrix} [m \ c]^T$$

now let $$\overline{F} = \begin{bmatrix} F_{INT}(1) \\ F_{INT}(2) \\ \vdots \\ F_{INT}(n) \end{bmatrix} \text{ and } \overline{V} = \begin{bmatrix} V(1) - V(o) & V_{INT}(1) \\ V(2) - V(1) & V_{INT}(2) \\ \vdots & \vdots \\ V(n) - V(n-1) & V_{INT}(n) \end{bmatrix}$$

$\overline{F}$ and $\overline{V}$ are now substituted into the following cost function that is known to those of skill in the art:

$$J = \|\overline{F} - \overline{V} \cdot [m \ c]^T\|,$$

where $\|B\|$ is a Frobenius norm of B. The solution to this cost function is determined according to a well known technique to be the following:

$$\begin{bmatrix} m \\ c \end{bmatrix} = (\overline{V}^T \cdot \overline{V})^+ \cdot \overline{V}^T \cdot \overline{F}$$

where ($\overline{V}$hu T•$\overline{V}$) is the pseudoinverse of $\overline{V}^T \cdot \overline{V}$.

Thus, Newton's second law may be used to calculate vehicle mass using the speed data signals and the push force data collected in the manner previously described.

In order to ensure accuracy of the calculation of vehicle mass and aerodynamic coefficient, it is preferable that a recursive estimation technique be employed. Such a technique requires the above-described cost solution to be minimized, which may be expressed as follows:

$$\min\|\overline{F} - \overline{V} \cdot \Theta\|, \quad \Theta = [m \ c]^T$$

The recursive least square solution to the above equation may be expressed by the following equations, whose origins and derivation are well known to those skilled in the art.

$$\epsilon(i) = \overline{F}(i) - \overline{V}(i)\hat{\Theta}(i-1)$$

$$\hat{\Theta}(i) = \Theta(i-1) + \gamma(i) R^{-1}(i) \overline{V}^T \epsilon(i)$$

$$R(i) = R(i-1) + \gamma(i)[\overline{V}^T \cdot \overline{V} - R(i-1)]$$

where $\epsilon(i)$ is the prediction error, $\hat{\Theta}$ (i) is the current estimate, R(i) is the covariance, and $\gamma(i)$ is between 0 and 1 and is known in the art as the forgetting factor of the recursive algorithm. The above recursive least square solution is employed continually to update the solution of mass and aerodynamic coefficient by modifying the previous solution to accommodate the previous estimation error.

In one embodiment, the matrix inverse of inverse $R^{-1}(i)$ required by the above equation is solved by analytically expressing the matrix inverse as follows:

$$R^{-1} = \begin{bmatrix} R_{11} & R_{12} \\ R_{21} & R_{22} \end{bmatrix}^{-1} = \frac{1}{R_{11} \cdot R_{22} - R_{12} \cdot R_{21}} \cdot \begin{bmatrix} R_{22} & R_{12} \\ R_{21} & R_{11} \end{bmatrix}$$

This expression of the matrix inverse simplifies the computation of the recursive estimate of vehicle mass and aerodynamic coefficient.

The above described RLS estimation equations are solved by control computer 12 preferably each time the buffer is half-filled with new data. The qualified data segment containing the greatest number of qualified data points is selected from the buffered data. However, other embodiments contemplate any other selection techniques for the data stored in the buffer. For example, all qualified data segments in a buffer may be used to calculate an estimated vehicle mass and aerodynamic coefficient. Alternatively, a technique may be employed which selects some or all of the qualified data points in the buffer in order to estimate vehicle mass and aerodynamic coefficient. It should be understood that an estimate of mass and aerodynamic coefficient are recursively calculated using the push force and vehicle speed data collected, filtered, and qualified in accordance with the present invention. The estimates are more accurate than other known techniques since the recursive analysis calculates and adjusts for estimation error of a previous estimate. This error is often inherent in vehicle speed and engine fueling signal data.

From step 112 algorithm 100 continues at step 114, where control computer 12 corrects the RLS solution based on boundaries estimated for upper and lower limits for mass and vehicle aerodynamic coefficient. In an alternate embodiment, such a correction is not made and algorithm 100 proceeds at step 118.

At step 116, in case such a correction is employed, there are basically three situations which may result from the estimation of vehicle mass and aerodynamic coefficient. First, the RLS solution may fall outside the limits of both mass and aerodynamic coefficient. In such a case the solution is abandoned and the limit values are used as solutions. Second, the RLS solution may be within the limits prescribed for both parameters. In this case the RLS solution will be used as the final result. Finally, if either mass or aerodynamic coefficient determined by the RLS solution falls outside its limits, the solution will be corrected as follows.

Let $\hat{\Theta} = [\hat{m} \ \hat{c}]$ and $\overline{\Theta} = [\overline{m} \ \overline{c}]$, where $\Theta$ is the original RLS solution, and $\overline{\Theta}$ is the corrected RLS solution. Then $$\begin{bmatrix} \overline{m} \\ \overline{c} \end{bmatrix} = \begin{bmatrix} \hat{m} \\ \hat{c} \end{bmatrix} + R^{-1} \begin{bmatrix} g_1 \\ g_2 \end{bmatrix}$$

where $g_1$ and $g_2$ are Kuhn-Tucker coefficients.

Let $R^{-1} = \begin{bmatrix} R_{11}^i & R_{12}^i \\ R_{21}^i & R_{22}^i \end{bmatrix}$ Then each parameter may be corrected as follows:

a. When $\hat{c}$ is less than its lower limit ($c_{LL}$)

$$\overline{c} = c_{LL}, \quad \overline{m} = \hat{m} + (c_{LL} - \hat{c}) \cdot \frac{R_{12}^i}{R_{22}^i}$$

b. When $\hat{c}$ is greater than its upper limit ($c_{UL}$)

$$\overline{c} = c_{UL}, \quad \overline{m} = \hat{m} + (c_{UL} - \hat{c}) \cdot \frac{R_{12}^i}{R_{22}^i}$$

c. When $\hat{m}$ is less than its lower limit ($m_{LL}$)

$$\overline{m} = m_{LL}, \quad \overline{c} = \hat{c} + (m_{LL} - \hat{m}) \cdot \frac{R_{21}^i}{R_{11}^i}$$

d. When $\hat{m}$ is greater than its upper limit ($m_{UL}$)

$$\overline{m} = m_{UL}, \quad \overline{c} = \hat{c} + (m_{UL} - \hat{m}) \cdot \frac{R_{21}^i}{R_{11}^i}$$

If m and c fall outside the limits after completing the above correction calculations, the RLS solution is abandoned and the limit values are used as the solution.

Once any corrections are made pursuant to step 116, the algorithm 100 proceeds at step 118 where mass and aerodynamic coefficient are output. The algorithm 100 then proceeds at step 120, where control computer 12 is returned to step 102 for processing of new data in accordance with the present invention.

In an alternate embodiment of the present invention, the aerodynamic coefficient c of the vehicle is a known value and is programmed into control computer 12 accordingly. This greatly simplifies the above described algorithm by eliminating one unknown. Thus, the above described equations may be modified as follows:

$$\overline{F} = \begin{bmatrix} F_{INT}(1) - V_{INT}(1) \cdot c \\ F_{INT}(2) - V_{INT}(2) \cdot c \\ \vdots \\ F_{INT}(n) - V_{INT}(n) \cdot c \end{bmatrix} \quad \overline{V} = \begin{bmatrix} V(1) - V(\Theta) \\ V(2) - V(1) \\ \vdots \\ V(n) - V(n-1) \end{bmatrix}$$

When the above equations are combined with the RLS estimation equations, the solution is reduced to a scalar equation and the solution becomes much simpler.

Figure 3A:
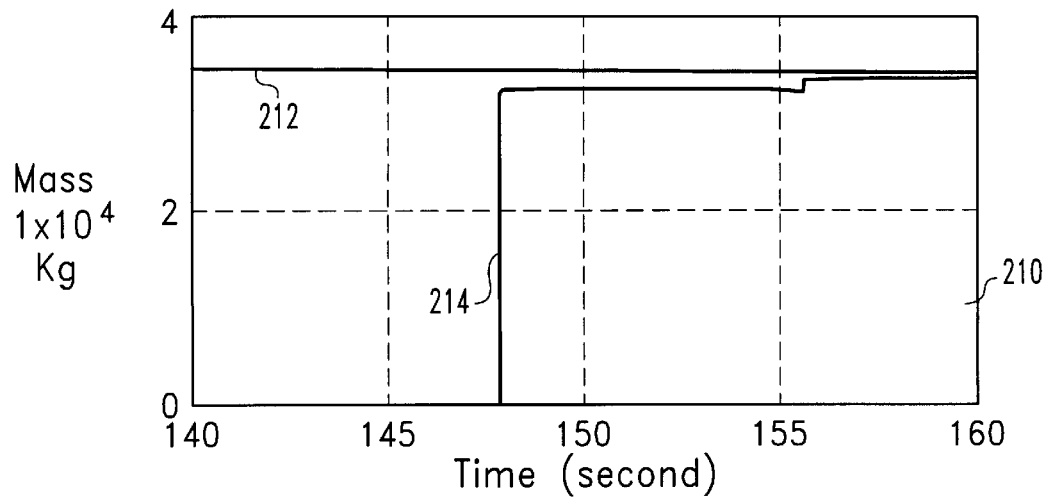
FIG. 3A is a graph illustrating an estimate of mass of a moving vehicle utilizing the principles of the present invention.

In FIGS. 3A–3F, an example utilizing the techniques of the present invention to estimate mass and vehicle aerodynamic coefficient is illustrated. The horizontal axis of each of the graphs presented in FIGS. 3A–3F correspond to the same time scale of 140 to 160 seconds. The vertical axis of FIG. 3A corresponds to vehicle mass in units of $1 \times 10^4$ Kilograms (Kg). The graph 210 of FIG. 3A illustrates the estimation of vehicle mass in accordance with the present invention. The recursive estimate is indicated with line 214. Graph 210 also includes a reference line 212 which is indicative of actual vehicle mass for comparison. As the leftmost vertical segment of line 214 indicates, algorithm 100 does not determine an estimated mass until a qualified data segment is located at approximately 148 seconds. A second segment of qualified data is located at approximately 156 seconds corresponding to a smaller vertical segment in line 214. This second qualified data segment corresponds to a second mass estimate. After this second mass estimate, line 214 is nearly coincident with line 212. Thus, as graph 210 illustrates, the present invention provides an advantageous technique to estimate vehicle mass.

Figure 3B:
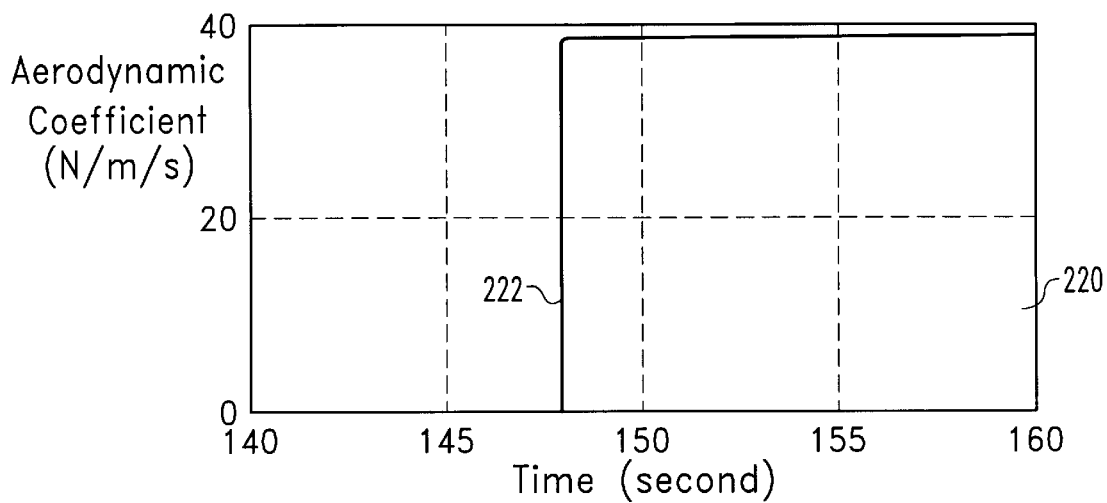
FIG. 3B is a graph illustrating an estimate of an aerodynamic coefficient of the same vehicle as utilized in FIG. 3A in accordance with the principles of the present invention.

In FIG. 3B, a graph of aerodynamic coefficient estimation is illustrated and designated generally at 220. The vertical axis for graph 220 is in units of Newtons/meters/seconds (N/m/s). Graph 220 includes an estimate line 222 which is indicative of estimated aerodynamic coefficient. As the leftmost vertical segment of line 222 indicates, the aerodynamic coefficient is initially calculated along with vehicle mass at time 148 seconds.

Figure 3C:
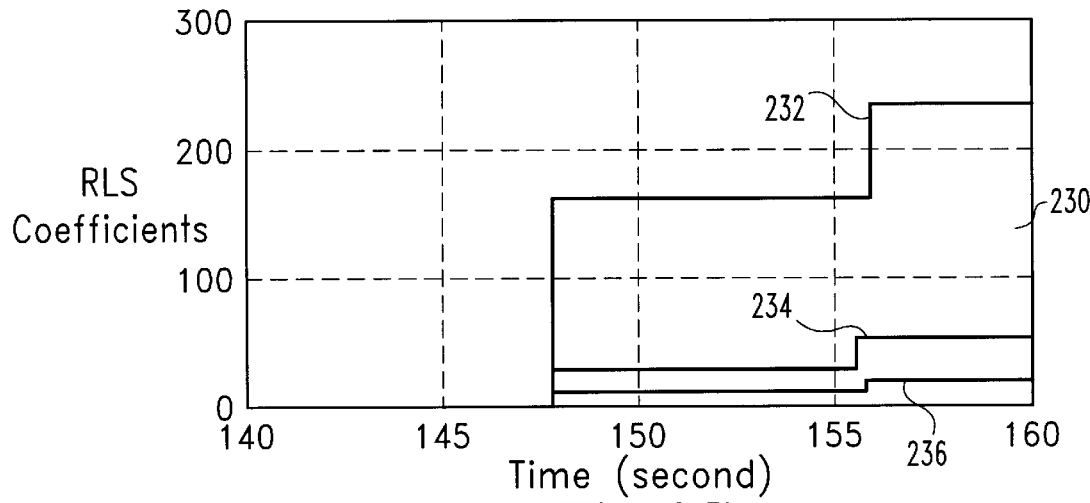
FIG. 3C is a graph of the RLS covariances for the estimates of FIGS. 3A and 3B.

The remaining graphs of FIGS. 3C–3F are directed to illustration of various operational data of the present invention that correspond to the estimates of FIGS. 3A and 3B. FIG. 3C includes graph 230, which illustrates the RLS covariance matrix values for covariance matrix R, indicated by line 232 ($r_{11}$), line 234 ($r_{12}$), and line 236 ($r_{22}$). Lines 232, 234, and 236 each exhibit a stairstep pattern corresponding to the qualified data segments at about 148 and 156 seconds.

Figure 3D:
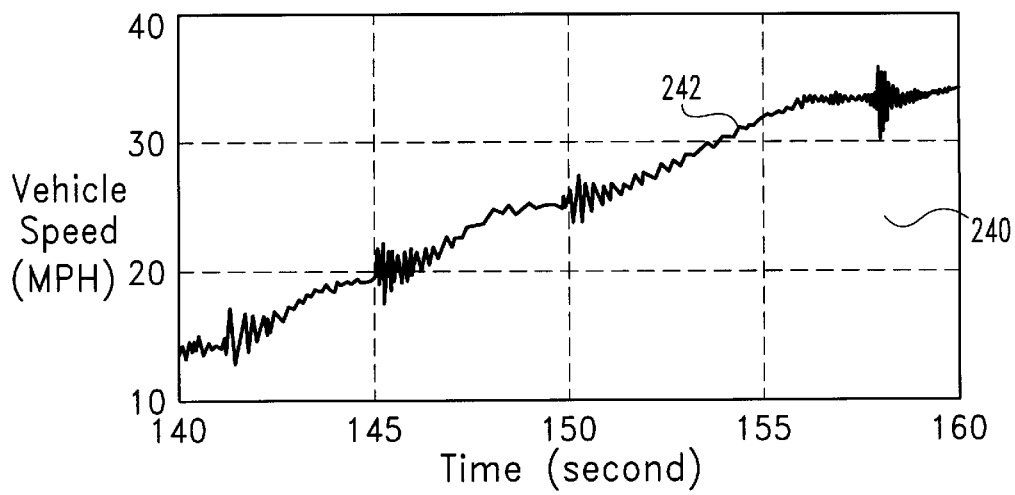
FIG. 3D is a graph of vehicle speed corresponding to the estimates of FIGS. 3A and 3B.
Figure 3E:
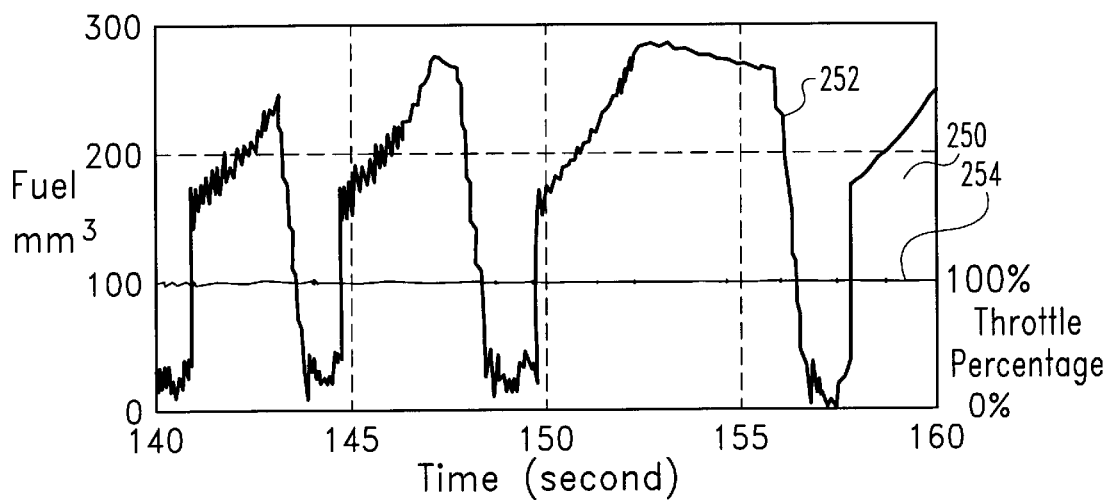
FIG. 3E is a graph of the fueling rate and throttle percentage of the vehicle for the estimates of FIGS. 3A and 3B.
Figure 3F:
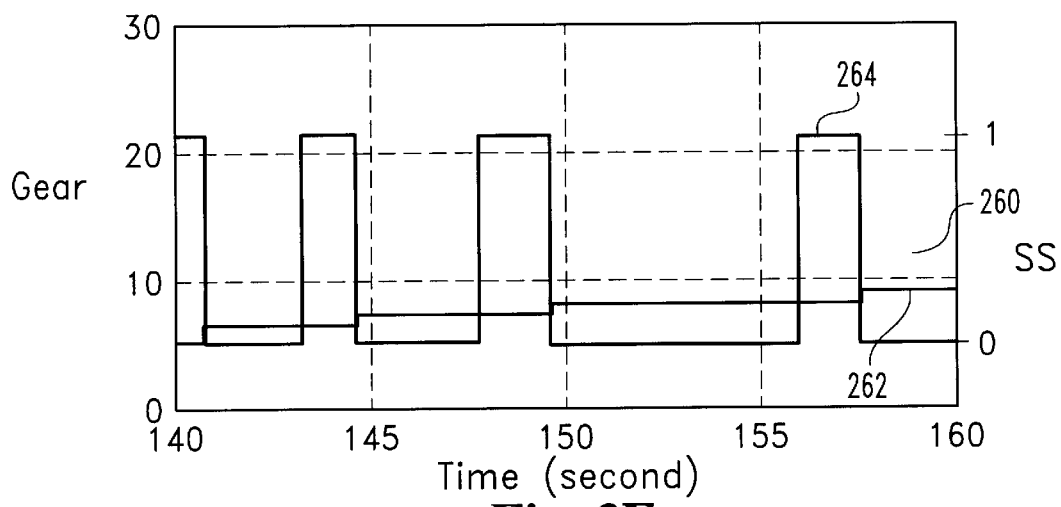
FIG. 3F is a graph of engaged gear ratio and shift status of the vehicle for the estimates of FIGS. 3A and 3B.

FIG. 3D includes graph 240, which illustrates a line 242. Line 242 is depicts vehicle speed in units of Miles Per Hour (MPH) as indicated by the vertical scale. FIG. 3E illustrates graph 250 that includes lines 252 and 254. Line 252 depicts fueling rate in units of cubic millimeters as indicated by the leftmost vertical scale. Line 254 depicts throttle position in terms of percent as indicated by the rightmost vertical scale. FIG. 3F illustrates graph 260 that includes line 262 and line 264. Line 262 depicts the engaged gear number as indicated by the leftmost vertical scale and line 264 depicts the discrete-valued shift status signal SS as indicated by the rightmost vertical scale. Collectively, the graphs of FIGS. 3C–3F illustrate the measurement of the various operational data from the vehicle gathered and processed in accordance with the present invention.

It should be appreciated that as used herein, data, variables, data points, values, stages, steps, inputs, and outputs each correspond to a signal within processing equipment of the present invention. Moreover, the various techniques, stages, steps, operations, processes, and routines, of the present invention may be rearranged, substituted, combined, altered, or deleted as would occur to one skilled in the art without departing from the spirit of the present invention.

While the invention has been illustrated and described in detail in the drawings and foregoing description, the same is to be illustrative and not restrictive in character, it being understood that only the preferred embodiments have been shown and described and that all changes and modifications, which come within the spirit of the invention, are desired to be protected.

What is claimed is:

1. A method of estimating the mass of a vehicle, the vehicle including an internal combustion engine, the engine producing a torque in accordance with a fueling rate provided by a fueling system thereof, the torque being applied to a drive-train coupled to the engine, the drive train including a transmission coupled to the engine having a plurality of engageable gear ratios, a drive axle and a propeller shaft coupling the drive axle to the transmission, the drive axle including at least one wheel for moving the vehicle, the method comprising:

(a) periodically determining a vehicle speed and a vehicle push force corresponding to the vehicle speed and storing corresponding vehicle speed and vehicle push force data within a memory portion of a control computer;

(b) qualifying a segment of the vehicle speed and push force data; and (c) determining vehicle mass by a recursive least square estimation analysis of the segment of data by defining the vehicle speed as a function of the push force.

2. The method of claim 1, further comprising estimating a vehicle aerodynamic coefficient.

3. The method of claim 2 further comprising correcting the vehicle mass and the aerodynamic coefficient when at least one of the vehicle mass and the aerodynamic coefficient is beyond a predetermined limit.

4. The method of claim 1, wherein said periodically determining the vehicle speed includes sensing the rotational speed of a vehicle component.

5. The method of claim 1, wherein said periodically determining the vehicle push force includes sensing engine fueling to determine an engine torque, converting the engine torque to a tire torque based on an engaged gear ratio, and converting the tire torque to the vehicle push force.

6. The method of claim 1, wherein said periodically determining vehicle speed and push force includes determining a shift status, the shift status corresponding to a determination of vehicle speed and push force.

7. The method of claim 6, wherein said qualifying includes buffering the vehicle speed, push force, and shift status data, and selecting the longest qualified segment therefrom.

8. The method of claim 6, wherein said qualifying includes establishing a throttle percentage exceeding a threshold amount.

9. The method of claim 8, wherein said threshold amount is 30%.

10. The method of claim 6, wherein said qualifying includes establishing a torque percentage exceeding a threshold amount.

11. The method of claim 6, wherein said qualifying includes establishing a brake status.

12. The method of claim 6, wherein said qualifying includes establishing the transmission is in-gear.

13. The method of claim 1, further including adjusting a control computer parameter in accordance with the estimated vehicle mass.

\* \* \* \* \*